Sept. 2, 1969 JUNICHI URA 3,464,613

AUTOMATIC BELT TENSION CONTROL DEVICE

Filed May 29, 1967 2 Sheets-Sheet 1

INVENTOR

JUNICHI URA

BY Stevens, Davis, Miller & Mosher

ATTORNEYS

Sept. 2, 1969 JUNICHI URA 3,464,613

AUTOMATIC BELT TENSION CONTROL DEVICE

Filed May 29, 1967 2 Sheets-Sheet 2

INVENTOR

JUNICHI URA

BY Stevens, Davis, Miller & Mosher

ATTORNEYS

United States Patent Office 3,464,613

Patented Sept. 2, 1969

3,464,613

AUTOMATIC BELT TENSION CONTROL DEVICE

Junichi Ura, Yokohama, Japan, assignor to Victor Company of Japan, Limited, Yokohama, Japan Filed May 29, 1967, Ser. No. 641,827
Claims priority, application Japan, June 3, 1966, 41/35,431
Int. Cl. B65h 17/44
U.S. Cl. 226—178 4 Claims

ABSTRACT OF THE DISCLOSURE

An automatic belt tension control device in a magnetic recording and reproducing apparatus having an oscillatably supported tension arm and a pressure contact member adapted to bear against a belt which is trained around a driving pulley and driven pulley for driving a capstan at one end of the tension arm. The tension arm is adapted to rest against a non-eccentric portion of a cam shaft in recording operation and against an eccentric portion of said cam shaft in reproducing operation.

This invention relates to an automatic belt tension control device in a magnetic recording and reproducing apparatus, and in particular to a device for automatically varying the tension of a belt for driving a capstan to accommodate variations in the operating conditions of the capstan from those of recording operation to those of reproducing operation due to a change in load whereby the capstan can be driven in the same manner under controlled conditions both in recording operation and reproducing operation.

In a magnetic recording and reproducing apparatus e.g. video tape recorders, wherein a capstan is driven by means of a belt, obtaining good reproduced pictures has hitherto been hampered by a change in load (due to slippage for example) occurring in reproducing operation as compared with recording operation.

The present practice in video tape recorders is to vary the torque of an electric motor on the supply side to compensate for aberration in pictures occurring in reproducing operation. In the case of video tape recorders of the double capstan system, however, it has been impossible to effect correction satisfactorily by merely relying on a variation in torque of the motor of the supply side, because the capstan on the supply side blocks the transmission of the variation in torque.

The present invention obviates the disadvantage of magnetic recording and reproducing apparatus of prior art as mentioned above. According to the invention, the tension of a belt for transmitting drive to a capstan is automatically varied so that the capstan can be operated in exactly identical conditions both in recording operation and reproducing operation.

A principal object of this invention is to provide an automatic belt tension control device in a magnetic recording and reproducing apparatus whereby the apparatus can be operated in exactly identical conditions both for recording and reproducing so that various troubles, such as tracking errors, for example, stemming from aberration in operating conditions can be obviated.

Another object of the invention is to provide an automatic belt tension control device in a magnetic recording and reproducing apparatus whereby the tension of a belt for transmitting drive to a capstan is kept constant in recording operation but controlled in reproducing operation so as to accommodate changes in operating conditions occurring in reproducing operation as compared with recording operation whereby the operating condition in reproducing operation can become exactly identical with the operating condition in recording operation to provide good reproduced pictures.

A further object of the invention is to provide an automatic belt tension control device in a magnetic recording and reproducing apparatus whereby the slip rate of a capstan can be varied directly over a wide range, the device being capable of application to apparatus of both the single capstan system and the double capstan system.

Other objects and features of the present invention will become readily apparent as the same becomes better understood by reference to the following detailed description of the invention and the attached drawings, in which.

Figure 1:
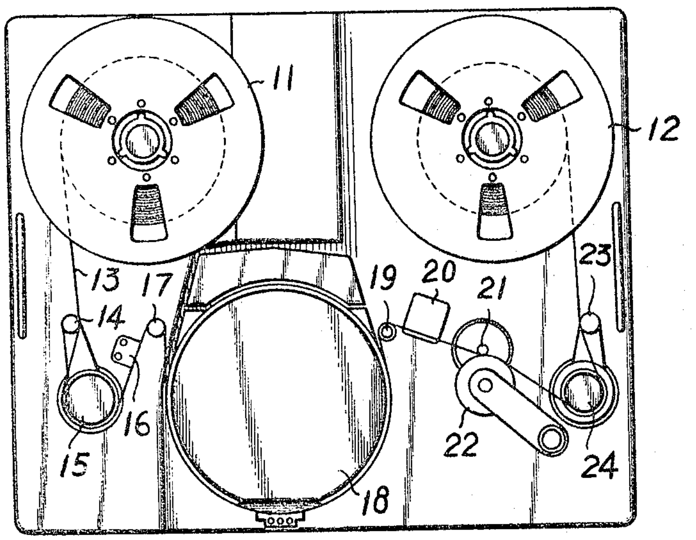
FIGURE 1 is a plan view of a video tape recorder shown as one example of a magnetic recording and reproducing apparatus in which the device according to this invention can be incorporated.

The invention will now be explained with reference to FIG. 1 in which 11 designates a supply reel which is disposed at a higher level vertically than a take-up reel 12. The magnetic tape 13 unwound from the supply reel 11 is led past a roller 15 having a tension arm 14 and a vacuum control member 16 for imparting proper tension to said magnetic tape by controlling suction pressure to said magnetic tape, past a guide roller 17 to a guide drum 18 containing rotary magnetic heads about which the tape travels in the manner Ω for about one-half of the circumference thereof, thence past a guide roller 19 and brought into contact with a fixed magnetic head block 20 for recording sound signals and control signals, from which the tape passes through a capstan 21 and a pinch roller 22, led past a roller 24 having a tension arm 23, and wound about the take-up reel 12. The magnetic tape 13 which travels about the guide drum 18 in the manner Ω for about one-half of the circumference thereof moves relative to the rotary magnetic head in such a manner that the longitudinal axis of the tape is tilted or helical with respect to the rotating surface of the rotary magnetic heads. The capstan 21 is driven by means of a belt from a drive source, such as an electric motor.

Figures 2, 3:
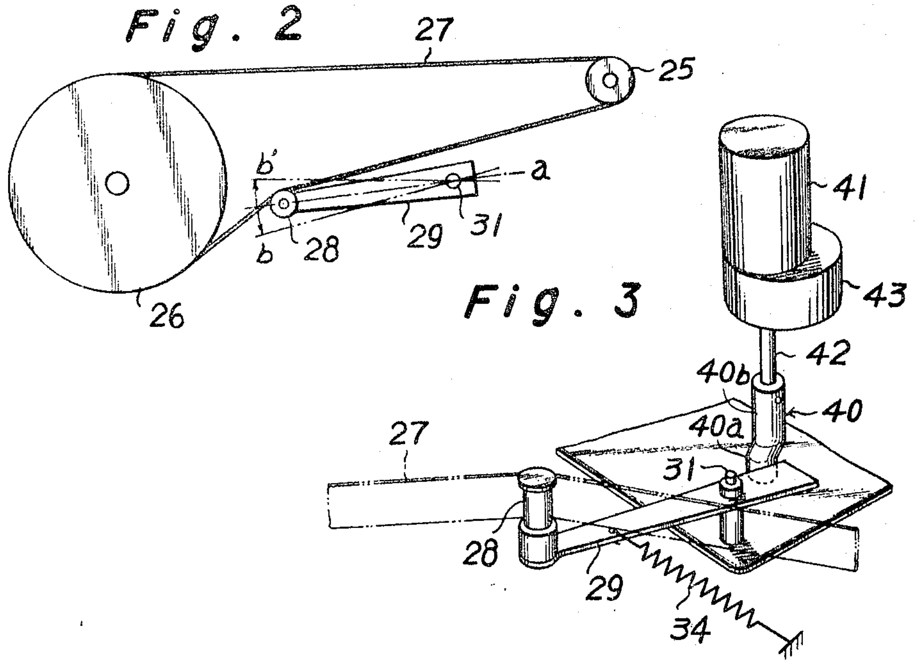
FIGURE 2 is a diagrammatic view to explain the principles of operation of this invention.
FIGURE 3 is a perspective view of one embodiment of the device of this invention.

In FIG. 2, 25 designates a driving pulley mounted as on the rotating shaft of a motor on the driving side; 26 designates a driven pulley mounted on the capstan on the driven side; and 27 designates a belt trained around said drive pulley and said driven pulley. A tension arm 29 having at one end thereof a pressure contact member 28, such as a roller, bears against the belt 27. According to the invention, a constant tension is imparted to the belt 27 in the following manner: in recording operation, the tension arm 29 is secured in place in a position shown by a single dot-and-dash line *a;* but in reproducing operation when it is required to properly adjust the tension of the belt, the tension arm 29 is caused to oscillate between the positions *b* and *b'* shown by double dot-and-dash lines in accordance with a variation in operating condition as compared with recording operation whereby operating conditions can be made exactly identical for both recording and reproducing.

Figure 4:
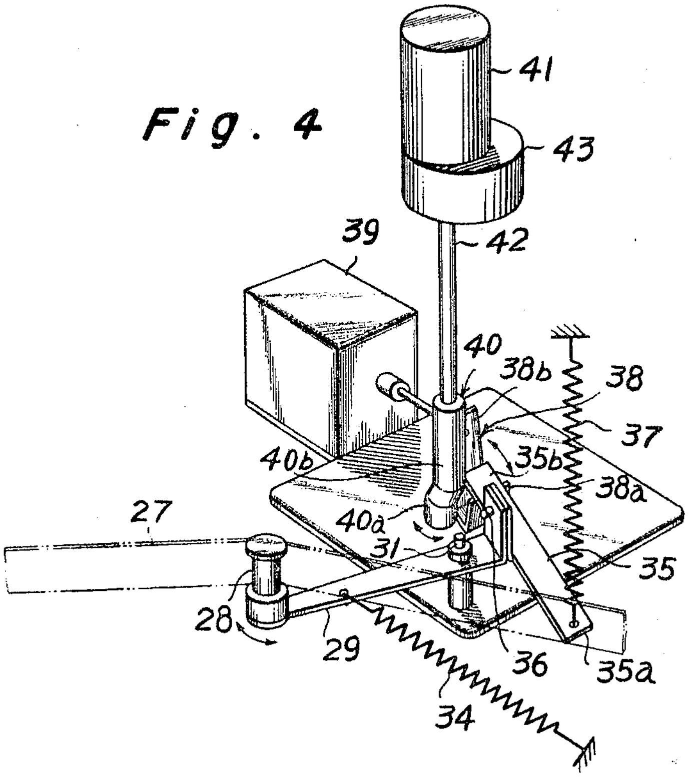
FIGURE 4 is a perspective view of the other embodiment of the device of this invention.

In FIGS. 3 to 5 are shown embodiments incorporating the principles of the invention described hereinabove. Like reference characters designate similar parts in the drawings. In the embodiment shown in FIG. 3, the tension arm 29 is connected at one point to a spring 34 which urges the tension arm 29 in a direction in which no tension is imparted to the belt 27. In the embodiment shown in FIG. 4, at the other end of the tension arm 29, an oscillating lever 35 is pivotally connected to the arm at substantially right angles thereto. Said oscillating lever 35 is urged upwardly at one end 35*a* thereof by a spring 37, while the other end 35*b* thereof rests on one end 38*a* of a generally U-shaped member 38 yieldably connected at the other end 38*b* to a plunger 39. Disposed on one side of said the other end 35*b* of said oscillating lever 35 is a cam shaft 40 having an eccentric portion 40*a* at the lower portion thereof. The cam shaft 40 is connected to an electric motor 41 adapted to be rotated by the actuation of detection means, such as a known capstan servo signal detector, upon occurrence of any variation in operating condition in reproducing operation as compared with recording operation. Interposed between said eccentric portion 40*a* of the cam shaft 40 and a non-eccentric portion 40*b* thereof is a gently tilted portion which facilitates the transfer of the other end 35*b* of the oscillating lever 35 from a position where it keeps contact with the eccentric portion 40*a* to a position where it is brought into contact with the non-eccentric portion 40*b* in reproducing operation.

The mode of operation of this arrangement will now be be explained.

In the first embodiment, the eccentric portion 40*a* of the cam shaft 40 rests against the other end of the tension arm 29. In recording operation, the cam shaft 40 is adapted to halt in a predetermined position, and the tension arm 29 is secured in place in a predetermined position, so that recording operation can be performed under a predetermined tension of the belt. In reproducing operation, when there is some variation in operating condition as compared with recording operation, variation detecting means is actuated to operate the motor 41 to thereby rotate the cam shaft 40. This causes the pressure contact member 28 at one end of the tension arm 29 resting against the eccentric portion 40*a* of said cam shaft 40 to oscillate in an amount corresponding to a variation in operating condition occurring in reproducing operation as compared with recording operation, whereby the tension of the belt 27 can be properly adjusted to make operating condition in reproducing operation exactly identical with operating condition in recording operation.

Figures 5A, 5B:
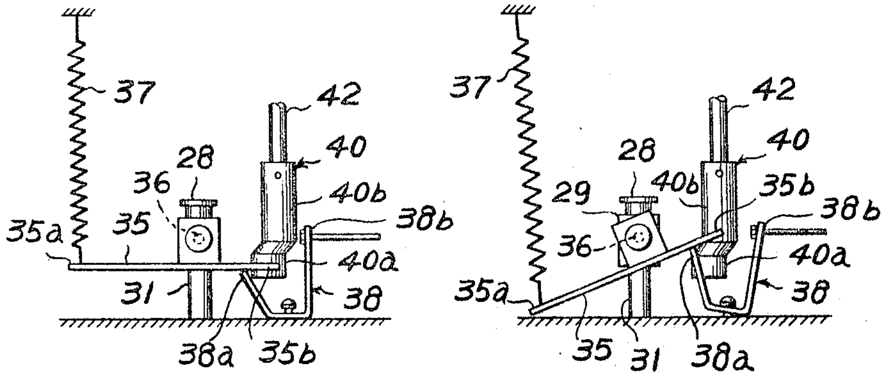
FIGURE 5A is a view showing the manner of operation of the essential portions of the embodiment of FIG. 4, in the recording function.
FIGURE 5B is a view showing the same in the reproducing function.

In the second embodiment of the invention, when a push-button switch (not shown) is operated in recording operation a plunger 39 is actuated to bring the generally U-shaped member 38 to an upright position as shown in FIG. 5A. Whereupon the other end 35*b* of the oscillating lever 35 resting on one end 38*a* of said generally U-shaped member 38 moves upwardly against the biasing force of spring 37 to be brought into contact with the non-eccentric portion 40*b* of the cam shaft 40. Thus, the tension arm 29 having the pressure contact member 28 at one end thereof is secured in place in a selected position, enabling to perform recording operation under a predetermined tension.

In reproducing operation, said plunger 39 is not actuated and the generally U-shaped member is brought to an inclined position, so that the biasing force of spring 37 causes the oscillating lever 35 to oscillate centering around a pivot 36, bringing the other end 35*b* thereof into contact with the eccentric portion 40*a* of the cam shaft 40. When there is some change in operating condition occurring in reproducing operation as compared with recording operation, actuation of detecting means which detects said change causes the motor 41 to operate to thereby rotate the cam shaft 40. This causes the pressure contact member 28, through the oscillating lever 35 in contact with the eccentric portion 40*a* of said cam shaft and the tension arm 29, to oscillate an amount corresponding to the change in operating condition occurring in reproducing operation as compared with recording operation to thereby adjust the tension of the belt 27, whereby operating condition in reproducing operation can be made exactly identical with operating condition in recording operation. The rotating shaft 42 of the electric motor 41 is not adapted for continuous rotation, but actuated through motor rotation adjusting means 43 in such a manner that said cam shaft 40 is rotated by said shaft of the motor in an amount corresponding to the change in operating condition occurring in reproducing operation as compared with recording operation. Such a motor control is well known in the art, for example see U.S. Patent No. 3,050,594 issued Aug. 21, 1962, to J. D. Bick et al., FIGURE 5.

Obviously, many modifications and variations of the present invention are possible in light of the above teachings. It should be understood, of course, that the foregoing disclosure relates to only preferred embodiments of the invention and that numerous modifications or alterations may be made therein without departing from the spirit and scope of the invention.

What I claim is:

1. An automatic belt tension control device in a magnetic recording and reproducing apparatus comprising a driving pulley, a driven pulley, a belt trained around said driving pulley and said driven pulley for driving a capstan, an oscillatably supported tension arm having at one end thereof a pressure contact member bearing against said belt, an oscillating lever pivotally connected to the other end of said tension arm substantially at right angles thereto, and means to keep said oscillating lever in a predetermined position in recording operation and to cause said oscillating lever to oscillate an amount corresponding to a change in operating condition occurring in reproducing operation as compared with recording operation.

2. An automatic belt tension control device in a magnetic recording and reproducing apparatus as claimed in claim 1 in which said oscillating lever is adapted to rest against a non-eccentric portion of a cam shaft in recording operation and against an eccentric portion of said cam shaft in reproducing operation, said eccentric portion and non-eccentric portion being connected together by a gently inclined portion of said cam shaft.

3. An automatic belt tension control device in a magnetic recording and reproducing apparatus as claimed in claim 2 including a U-shaped member, a plunger, means for connecting yieldably one end of said U-shaped member to said plunger, and means for resting one end of said oscillating lever on the other end of said U-shaped member, said oscillating lever being shifted from resting against said eccentric portion of the cam shaft to resting against said non-eccentric portion of the cam shaft by actuating said plunger.

4. An automatic belt tension control device in a magnetic recording and reproducing apparatus comprising a driving pulley, a driven pulley, a belt trained around said driving pulley and driven pulley for driving a capstan, an oscillatably supported tension arm having at one end thereof a pressure contact member adapted to bear against said belt, a cam shaft having an eccentric portion against which said tension arm is adapted to rest, and means for causing said cam shaft to rotate an amount corresponding to a change in operation condition occurring in reproducing operation as compared with recording operation.

References Cited

UNITED STATES PATENTS

2,927,743 3/1960 Shatavsky.
2,953,312 9/1960 Munroe __________ 226—178 X

M. HENSON WOOD, Jr., Primary Examiner

RICHARD A. SCHACHER, Assistant Examiner

U.S. Cl. X.R.

226—188